United States Patent [19]

Suzuki

[11] Patent Number: 5,442,607
[45] Date of Patent: Aug. 15, 1995

[54] JUMP PULSE CORRECTOR AND OPTICAL DISK UNIT

[75] Inventor: Haruyuki Suzuki, Yokohama, Japan

[73] Assignee: Ricoh Company, Ltd., Tokyo, Japan

[21] Appl. No.: 55,839

[22] Filed: Apr. 29, 1993

[30] Foreign Application Priority Data

May 1, 1992 [JP] Japan .................................. 4-139749

[51] Int. Cl.⁶ .............................................. G11B 7/09
[52] U.S. Cl. ................ 369/44.25; 369/44.28; 369/44.29; 369/44.34
[58] Field of Search .............. 369/44.28, 44.29, 44.25, 369/44.32, 44.34, 44.35, 44.36, 54, 58

[56] References Cited

U.S. PATENT DOCUMENTS

| | | | |
|---|---|---|---|
| 4,779,251 | 10/1988 | Burroughs | 369/44.29 |
| 5,079,756 | 1/1992 | Kuwabara | 369/44.29 |
| 5,097,458 | 3/1992 | Suzuki | 369/44.29 |
| 5,142,518 | 8/1992 | Hangai et al. | 369/44.29 |

Primary Examiner—Georgia Y. Epps
Assistant Examiner—Muhammad N. Edun
Attorney, Agent, or Firm—Cooper & Dunham

[57] ABSTRACT

A jump pulse corrector has a level holding device for holding the voltage level of a tracking error signal after a constant time since a pulse signal was transmitted to a light spot moving device. The jump pulse corrector also has a pulse height correcting device for correcting a wave height value of the pulse signal such that the voltage level of the tracking error signal is equal to a predetermined level. The jump pulse corrector is suitably used in an optical disk unit. The pulse height value is corrected such that the voltage level of the tracking error signal is equal to the predetermined value after the constant time since the pulse signal was transmitted. Accordingly, when actuator constants, etc. are changed, a suitable acceleration of a light spot is obtained and a stable jumping operation of the light spot is performed after these changes.

7 Claims, 9 Drawing Sheets

N LOOPS

- C=Const. — #21
- STEP JUMP — #22
- C = C+G* [TE(H)−H] — #23
- EXIT

Fig. 9

| LoopNo. | C | AC | TE(H) |
|---|---|---|---|
| 1 | 1 | 0.5 | 0.5 |
| 2 | 1.25 | 0.625 | 0.375 |
| 3 | 1.438 | 0.719 | 0.281 |
| 4 | 1.579 | 0.789 | 0.211 |
| 5 | 1.684 | 0.842 | 0.158 |
| 6 | 1.763 | 0.881 | 0.118 |
| 7 | 1.822 | 0.911 | 0.089 |
| 8 | 1.866 | 0.933 | 0.067 |
| 9 | 1.899 | 0.950 | 0.050 |
| 10 | 1.924 | 0.962 | 0.038 |
| 11 | 1.942 | 0.971 | 0.029 |
| 12 | 1.956 | 0.978 | 0.022 |
| ⋮ | ⋮ | ⋮ | ⋮ |
| ∞ | 2.0 | 1.0 | 0 |

| W | GAIN |
|---|---|
| 0 | 0 |
| ⋮ | ⋮ |
| 0.5 | 0.5 |
| ⋮ | ⋮ |
| 1.0 | 1.0 |
| ⋮ | ⋮ |
| 2.0 | 2.0 |
| ⋮ | ⋮ |

| Loop No. | W | AC | TE(H) | |
|---|---|---|---|---|
| 1 | 1 | 0.8 | 0.2 | |
| 2 | 1.1 | 0.88 | 0.12 | |
| 3 | 1.16 | 0.928 | 0.072 | |
| 4 | 1.196 | 0.956 | (0) | ← ERROR IN MEASUREMENT |
| 5 | 1.196 | 0.956 | 0.044 | |
| 6 | 1.218 | 0.974 | 0.026 | |
| 7 | 1.221 | 0.976 | 0.024 | G = 0.1 FROM HERE |
| 8 | 1.223 | 0.979 | 0.021 | |
| 9 | 1.225 | 0.980 | (0.3) | ← ERROR IN MEASUREMENT |
| 10 | 1.255 | 1.004 | −0.004 | |
| 11 | 1.2546 | 1.0037 | −0.0037 | |
| ⋮ | ⋮ | ⋮ | ⋮ | |
| ∞ | 1.25 | 1 | 0 | ← FINAL VALUE |

JUMP PULSE CORRECTOR AND OPTICAL DISK UNIT

BACKGROUND OF THE INVENTION

1. Field of the Invention

The present invention relates to a track jumping circuit and a tracking servo circuit suitably used in an optical disk unit for optically recording and reproducing information. More particularly, the present invention relates to a jump pulse corrector and an optical disk unit in which a step jumping operation can be accurately performed and a track follow-up servo operation can be stabilized even when an actuator constant is changed in a track follow-up servo for displacing a light spot in a direction perpendicular to a track of an optical disk.

2. Description of the Related Art

In a general optical disk unit for optically recording and reproducing information, a light spot following up a track of an optical disk is moved onto an adjacent track at a high speed. Such a moving operation is called a track jumping operation or a step jumping operation. For example, the step jumping operation is described in detail in "Technique of Optical Disk", pp. 161-165 published by radio technique company on Feb. 10, 1989.

In this step jumping operation, the operating state of a track follow-up servo is set to an opening state. An accelerating pulse having a predetermined pulse height is transmitted to a tracking actuator. After a constant time, a decelerating pulse having a polarity inverse to that of the accelerating pulse is transmitted to the tracking actuator.

In this case, heights and time widths of the accelerating and decelerating pulses are designed such that the light spot is approximately moved by one track and a moving speed of the light spot is set to a desirable value such as zero when the pulses are completely applied.

However, when the optical disk unit is operated by using such constant pulse heights and time widths, the operation of the optical disk unit is influenced by dispersions in force constant of the actuator (generated thrust per unit electric current) and actuator mass. Further, in a system for applying a pulse voltage to the actuator, a moving acceleration of the actuator is dispersed by dispersion in resistance value of an actuator coil, etc.

Therefore, no moving amount of the light spot is equal to a length corresponding to one track and no moving speed of the light spot is equal to the desirable value when the movement of the light spot is completed.

Accordingly, in the general track follow-up servo, there is a problem that no light beam can be accurately positioned on an adjacent track.

Further, as mentioned above, when the force constant of the actuator, etc. are dispersed, a loop gain of the track follow-up servo is changed so that no track follow-up servo operation can be stably performed.

SUMMARY OF THE INVENTION

It is therefore an object of the present invention to provide a jump pulse corrector and an optical disk unit in which a step jumping operation can be accurately performed and a track follow-up servo operation can be stably performed even when an actuator constant is changed.

In accordance with a first structure of the present invention, the above object can be achieved by a jump pulse corrector comprising light spot moving means for displacing a light spot in a direction perpendicular to a track of a disk; tracking error signal detecting means for outputting a tracking error signal obtained in accordance with the relation in relative position between the light spot and the track; pulse signal generating means for transmitting a pulse signal for moving the light spot in the direction perpendicular to the track to the light spot moving means; level holding means for holding a voltage level of the tracking error signal after a constant time since the pulse signal was transmitted to the light spot moving means; and pulse height correcting means for correcting a wave height value of the pulse signal such that the voltage level of the tracking error signal is equal to a predetermined value.

In the first structure of the present invention, the pulse height value is corrected such that the voltage level of the tracking error signal is equal to a predetermined value after a constant time since the pulse signal was transmitted to the light spot moving means.

Accordingly, when actuator constants, etc. are changed, a suitable acceleration of the light spot is obtained and a stable jumping operation of the light spot is performed after these changes.

In accordance with a second structure of the present invention, the above object can be achieved by a jump pulse corrector comprising light spot moving means for displacing a light spot in a direction perpendicular to a track of a disk; tracking error signal detecting means for outputting a tracking error signal obtained in accordance with the relation in relative position between the light spot and the track; pulse signal generating means for transmitting a pulse signal for moving the light spot in the direction perpendicular to the track to the light spot moving means; level holding means for holding a voltage level of the tracking error signal after a constant time since the pulse signal was transmitted to the light spot moving means; level comparing means for comparing the voltage level of the tracking error signal with a predetermined level; and pulse height correcting means for correcting a wave height value of the pulse signal by accumulating comparing results of the level comparing means to the wave height value of the pulse signal at a predetermined ratio.

In the second structure of the present invention, in addition to the effects of the first structure, no voltage value of the tracking error signal is easily influenced by an error in measurement of this signal in accordance with the effects of a low frequency filter obtained by the accumulation.

Accordingly, when actuator constants, etc. are changed, a more suitable acceleration of the light spot is obtained and a stable jumping operation of the light beam is performed after these changes.

In accordance with a third structure of the present invention, the above object can be achieved by a jump pulse corrector comprising light spot moving means for displacing a light spot in a direction perpendicular to a track of a disk; tracking error signal detecting means for outputting a tracking error signal obtained in accordance with the relation in relative position between the light spot and the track; pulse signal generating means for transmitting a pulse signal for moving the light spot in the direction perpendicular to the track to the light spot moving means; polarity inverting means for inverting a polarity of the pulse signal after a constant time since the pulse signal was transmitted to the light spot moving means; level holding means for holding a voltage level of the tracking error signal when the polarity of the pulse signal is inverted by the polarity inverting means; and pulse height correcting means for correcting a wave height value of the pulse signal such that said voltage level of said tracking error signal is brought to a predetermined value.

In the third structure of the present invention, the pulse height value is corrected on the basis of a voltage value of the tracking error signal when accelerating and decelerating operations are switched.

Accordingly, it is easy to obtain timing for detecting this voltage value so that the pulse height value can be corrected more accurately.

In accordance with a fourth structure of the present invention, the above object can be achieved by a jump pulse corrector comprising light spot moving means for displacing a light spot in a direction perpendicular to a track of a disk; tracking error signal detecting means for outputting a tracking error signal obtained in accordance with the relation in relative position between the light spot and the track; pulse signal generating means for transmitting a pulse signal for moving the light spot in the direction perpendicular to the track to the light spot moving means; polarity inverting means for inverting a polarity of the pulse signal after a constant time since the pulse signal was transmitted to the light spot moving means; level holding means for holding a voltage level of the tracking error signal when the polarity of the pulse signal is inverted by the polarity inverting means; and pulse height correcting means for correcting a wave height value of the pulse signal by accumulating comparing results of the level comparing means to the wave height value of the pulse signal at a predetermined ratio.

The effects obtained by the second and third structures are obtained in the fourth structure of the present invention.

In accordance with a fifth structure of the present invention, the voltage level of the tracking error signal is approximately set to zero.

In the fifth structure, a voltage value of the tracking error signal is set to zero as a target so that algorithm of the jump pulse corrector is simplified. Accordingly, in addition to the effects of the first structure, the pulse height value is corrected more accurately.

In accordance with a sixth structure of the present invention, the above object can be achieved by a jump pulse corrector comprising light spot moving means for displacing a light spot in a direction perpendicular to a track of a disk; tracking error signal detecting means for outputting a tracking error signal obtained in accordance with the relation in relative position between the light spot and the track; pulse signal generating means for generating a pulse signal; multiplying means for operating the light spot moving means in accordance with results obtained by multiplying a value shown by the pulse signal by a coefficient; level holding means for holding a voltage level of the tracking error signal after a constant time since the pulse signal was generated; and coefficient correcting means for correcting the coefficient such that the voltage level of the tracking error signal is equal to a predetermined value.

In the sixth structure, the correction coefficient can be calculated by a multiplying operation. Accordingly, the sixth structure can be widely applied to step jumping control of an actuator and other controls.

In accordance with a seventh structure of the present invention, the above object can be achieved by a jump pulse corrector comprising light spot moving means for displacing a light spot in a direction perpendicular to a track of a disk; tracking error signal detecting means for outputting a tracking error signal obtained in accordance with the relation in relative position between the light spot and the track; pulse signal generating means for generating a pulse signal; multiplying means for operating the light spot moving means in accordance with results obtained by multiplying a value shown by the pulse signal by a coefficient; level holding means for holding a voltage level of the tracking error signal after a constant time since the pulse signal was generated; level comparing means for comparing the voltage level of the tracking error signal with a predetermined level; and coefficient correcting means for correcting the coefficient by accumulating comparing results of the level comparing means to the coefficient at a predetermined ratio.

The effects obtained by the second and sixth structures are obtained in the seventh structure of the present invention.

In accordance with an eighth structure of the present invention, the above object can be achieved by an optical disk unit comprising light spot moving means for displacing a light spot in a direction perpendicular to a track of a disk; tracking error signal detecting means for outputting a tracking error signal obtained in accordance with the relation in relative position between the light spot and the track; pulse signal generating means for generating a pulse signal; multiplying means for operating the light spot moving means in accordance with results obtained by multiplying a value shown by the pulse signal by a coefficient; memory means for correcting and holding the coefficient such that a moving amount of the light spot according to an output of the multiplying means is equal to a predetermined amount; and position control means for controlling the relation in position between the track and the light spot displaced by the light spot moving means; the light spot moving means being operated in accordance with results obtained by multiplying an output of the position control means by the corrected coefficient.

In the eighth structure of the present invention, a corrected value of the multiplicative coefficient is also used in other controls except for step jumping control so that the entire position relation can be controlled stably and accurately even when actuator constants, etc. are changed.

In accordance with a ninth structure of the present invention, the above object can be achieved by an optical disk unit comprising light spot moving means for displacing a light spot in a direction perpendicular to a track of a disk; tracking error signal detecting means for outputting a tracking error signal obtained in accordance with the relation in relative position between the light spot and the track; pulse signal generating means for generating a pulse signal; multiplying means for operating the light spot moving means in accordance with results obtained by multiplying a value shown by the pulse signal by a coefficient; level holding means for holding a voltage level of the tracking error signal after a constant time since the pulse signal was generated; level comparing means for comparing the voltage level of the tracking error signal with a predetermined level; coefficient correcting means for correcting the coefficient by accumulating comparing results of the level comparing means to the coefficient at a predetermined ratio; memory means for holding the corrected coefficient of the coefficient correcting means; and position control means for controlling the relation in position between the track and the light spot displaced by the light spot moving means; the light spot moving means being operated in accordance with results obtained by multiplying an output of the position control means by the corrected coefficient.

The effects obtained by the second and eighth structures are obtained in the ninth structure of the present invention.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a jump pulse corrector and an optical disk unit in the present invention will next be described in detail with reference to the accompanying drawings. A first embodiment of the present invention corresponds to a first, third and fifth structures of the present invention.

Figure 1:
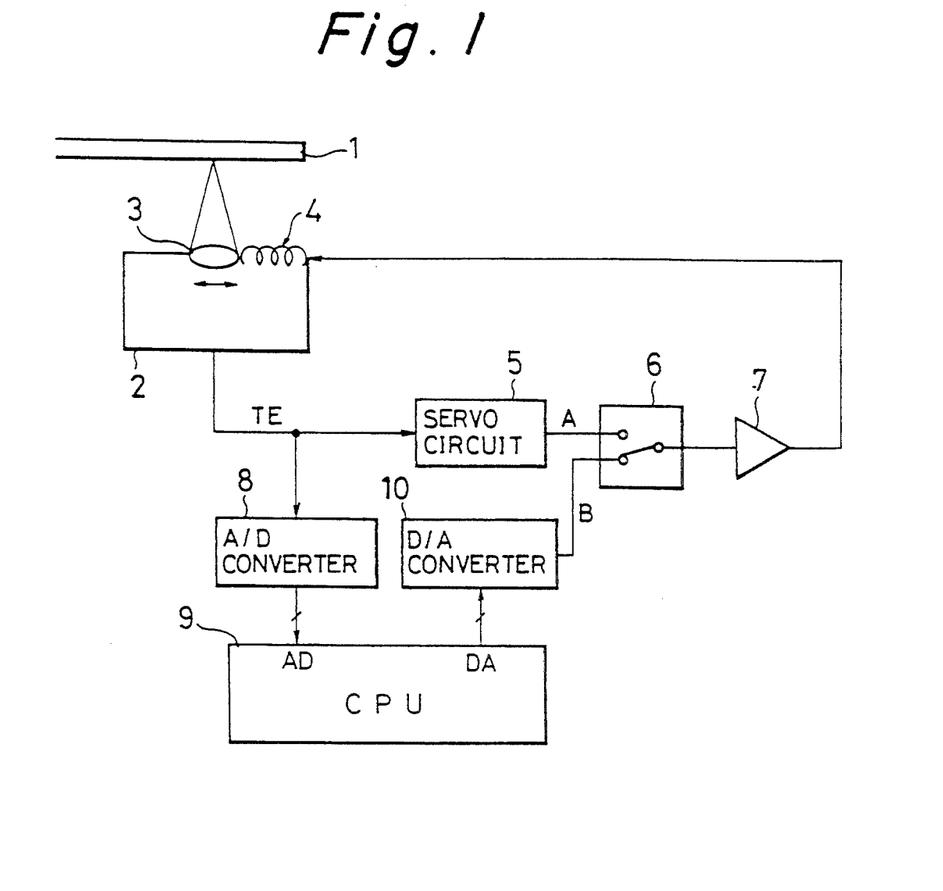
FIG. 1 is a functional block diagram showing one example of the main construction of a jump pulse corrector in accordance with a first embodiment of the present invention.

FIG. 1 is a functional block diagram showing one example of the main construction of a jump pulse corrector in accordance with the first embodiment of the present invention. In FIG. 1, reference numerals 1, 2 and 8 respectively designate an optical disk, an optical head and an objective lens. Reference numerals 4, 5 and 6 respectively designate an actuator, a servo circuit and a switching circuit. Reference numerals A and B designate input terminals of the switching circuit 6. Reference numerals 7, 8 and 9 respectively designate an amplifier, an A/D converter and a central processing unit (CPU). Reference numerals AID and DA respectively designate a digital signal input terminal and a digital signal output terminal of the CPU 9. Reference numerals 10 and TE respectively designate a D/A converter and a tracking error signal.

An operation of the jump pulse corrector in FIG. 1 common to that of the general jump pulse corrector will first be explained.

The optical head 2 has the objective lens 3. The optical disk 1, the optical head 2, the actuator 4, etc. constitute general constructional elements of a known optical disk unit. Light converged as a light spot and reflected on the optical disk 1 can be detected by the optical head 2.

The actuator 4 is driven by an output of the amplifier 7 such that the light spot is displaced in a direction perpendicular to a track of the optical disk 1. The actuator 4 can slightly displace the light spot in this perpendicular direction.

Similarly, a known tracking error signal TE can be obtained from the optical head 2.

The tracking error signal TE is changed as follows by the relation in position between the light spot and the track.

Figure 2:
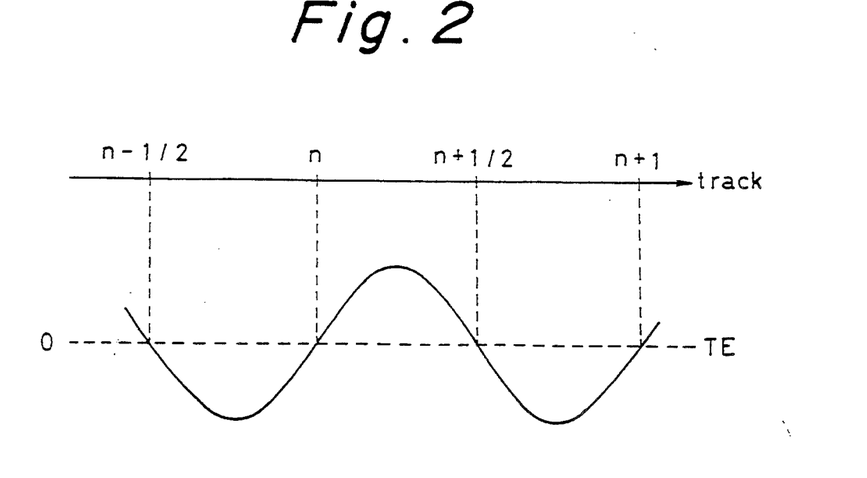
FIG. 2 is a view for explaining a changing state of a tracking error signal TE in an optical disk unit.

FIG. 2 is a view for explaining a changing state of the tracking error signal TE in the optical disk unit. In FIG. 2, reference numerals n and TE respectively designate a track number and a tracking error signal.

As shown in FIG. 2, the tracking error signal TE is periodically changed in accordance with the relation in position between the light spot and the track.

In general, this tracking error signal TE is set to zero in voltage on the track. A half period of the tracking error signal TE is provided by a half track. One period of the tracking error signal TE is provided by one track.

Such a tracking error signal TE is inputted to the known servo circuit 5 connected to an input terminal A of the switching circuit 8.

When the actuator 4 is driven through the amplifier 7, a known track follow-up servo operation is executed so that the light spot follows up a track.

The above-mentioned operation is similar to that of the general optical disk unit.

In the pulse jump corrector of the present invention shown in FIG. 1, the switching circuit 6 is switched to an input terminal B thereof from the input terminal A and a digital signal DA is outputted from the central processing unit (CPU) 9. Thus, the digital signal DA is converted to an analog signal having an analog voltage by the D/A converter 10. The analog voltage is directly applied to the actuator 4 so that the actuator 4 is driven.

In the following description, the analog voltage outputted from the input terminal B is set to B and an acceleration of the light spot is set to AC. In this case, the following relation between the voltage B and the acceleration AC is generally formed.

$$AC = (B/R)*(Kf/M) \tag{1}$$

In this formula (1), reference numerals R, Kf and M respectively designate a resistance value of an actuator coil, a thrust constant of the actuator (generated thrust per unit electric current) and a mass of the actuator.

In this formula (1), R, Kf and M are constants peculiar to the actuator so that the acceleration AC of the light spot is proportional to the voltage B.

If the input terminals A and B of the switching circuit 6 are switched at suitable timing and the voltage B is applied to the actuator 4, the light spot can be moved at an acceleration proportional to the voltage B.

In the jump pulse corrector in the first embodiment, the light spot is moved by control of the CPU 9 to exactly perform a step jumping operation and stably perform a track follow-up servo operation.

A control operation of the step jump using the CPU 9 will next be explained.

Figure 3:
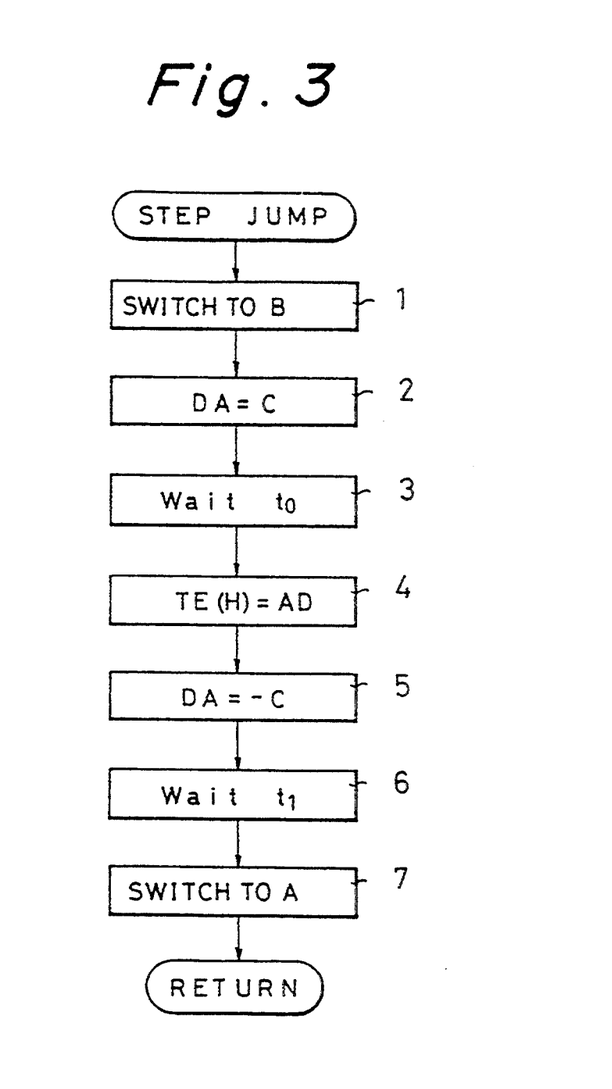
FIG. 3 is a flow chart showing a main processing flow of a central processing unit (CPU) 9 at a step jumping time in the jump pulse corrector in the first embodiment.

FIG. 3 is a flow chart showing a main processing flow of the central processing unit (CPU) 9 at a step jumping time in the jump pulse corrector in the first embodiment. In FIG. 3, reference numerals #1 to #7 designate processing steps.

In the step #1, the switching circuit 6 is switched from the input terminal A to the input terminal B.

In the next step #2, a digital signal DA is output ted as DA-commands from the CPU 9 to the D/A converter 10 so as to provide a command value C in an accelerating operation of the light spot.

In this state, the jump pulse corrector waits for a constant time $t_0$ in the step #3.

In the step #4, TE(H)=AD is set. "TE(H)=AID" means that the A/D converter 8 digitally converts the tracking error signal TE at a switching time of the DA-commands from command value C to command value −C and the CPU 9 reads a voltage value TE(H) of this digital signal from the A/C converter 8.

In the next step #5, the value C is changed to the value −C by switching the DA-commands so as to perform a decelerating operation of the light spot. Thereafter, the jump pulse corrector waits for a time $t_1$ in the step After the time $t_1$ has passed, it proceeds to the step #7 in which the switching circuit 6 is switched from the input terminal B to the input terminal A.

In the above processings in the steps #1 to #7, the step jumping operation is executed by the CPU 9.

In this case, no standby times $t_0$ and $t_1$ are necessarily set to be equal to each other. However, if $t_0$ is equal to $t_1$, a moving speed of the light spot is approximately equal to zero when the step jumping operation is completed, thereby obtaining very preferable results about an operation of the jump pulse corrector.

The relation between the value C and the standby time $t_0$ is designed in accordance with a jumping distance and a target value of a time required to perform the step jumping operation.

For example, when the jumping operation is performed by one track for a time of 0.5 ms, it is sufficient to move the light beam by a half track for a time of 0.25 ms. Accordingly, the relation between the time $t_0$ and the acceleration AC of the light spot is provided by the following formula (2).

$$\tfrac{1}{2}Tp = (\tfrac{1}{2}) \times AC * t_0^2 \tag{2}$$

In this formula (2), Tp shows a track pitch.

The required acceleration AC is then provided by the following formula (3).

$$AC = Tp/(t_0^2) \tag{3}$$

Accordingly, a required voltage B is provided by the following formula (4) from the formulas (3) and (1).

$$B = [Tp/(t_0^2)] * R * (M/Kf) \tag{4}$$

Therefore, a DA-command value for generating this voltage B is set to "C".

Figure 4:
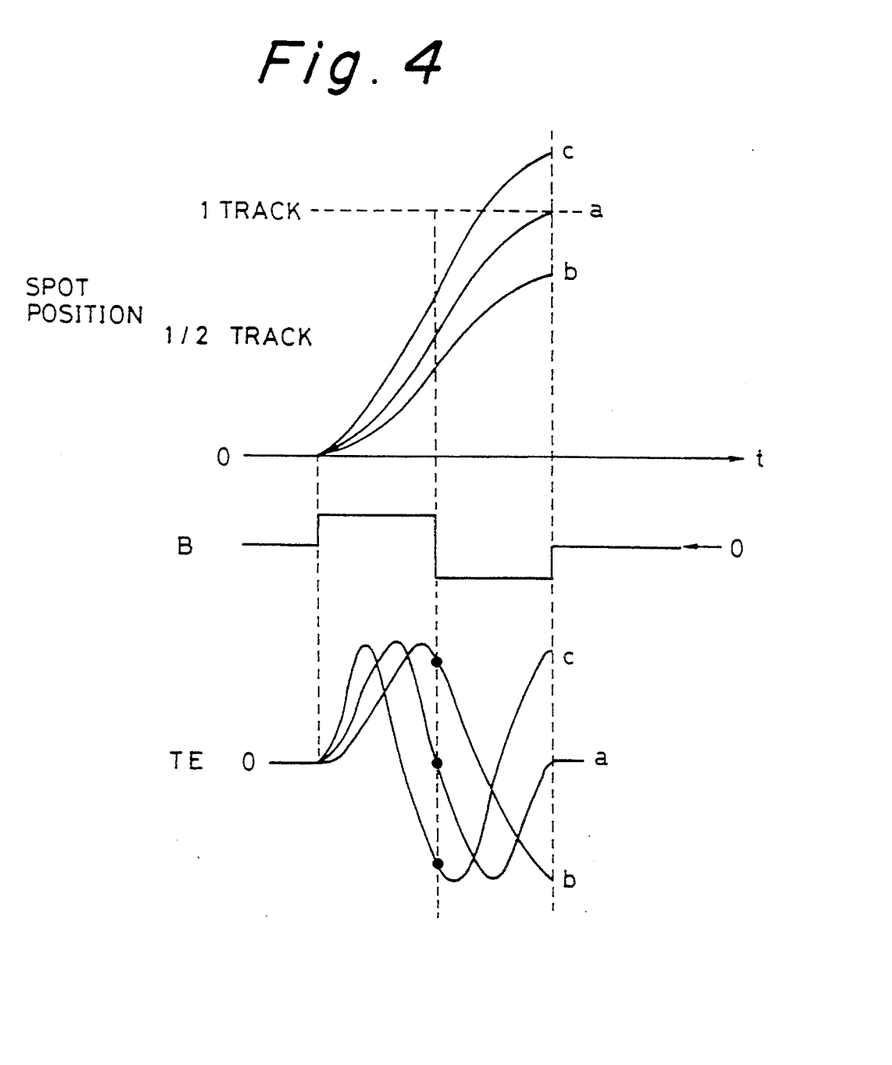
FIG. 4 is a view for explaining changing states of the position of a light spot, a voltage B and the tracking error signal TE with respect to time when a step jumping operation is performed in the jump pulse corrector in the first embodiment.

FIG. 4 shows the relation between a position of the light spot, the voltage B and the tracking error signal TE when the step jumping operation is performed by using the above designed value C and time $t_0$.

FIG. 4 is a view for explaining changing states of the position of the light spot, the voltage B and the tracking error signal TE with respect to time when the step jumping operation is performed in the jump pulse corrector in the first embodiment. In FIG. 4, an axis of abscissa shows time and an axis of ordinate shows the position of the light spot, the voltage B and the tracking error signal TE. Each of reference numerals a to c designates a waveform corresponding to each of the value C and the time $t_0$.

In FIG. 4, the waveform a shows a case in which the actuator constants Kf, R and M are equal to constant values used when the value C and the time $t_0$ are set at a designing time of the jump pulse corrector.

Accordingly, after the time $t_0$, the light spot is moved by a half track and the tracking error signal TE at this time is equal to zero in voltage.

In this case, in FIG. 2, the light spot begins to be moved from track n and is moved until $\{n+(\tfrac{1}{2})\}$ tracks after the time $t_0$.

In FIG. 4, after the time $t_0$ has passed, the voltage B is set to a voltage according to the value −C and a decelerating operation of the light spot is started.

When $t_0 = t_1$ is set, the light spot is similarly moved by a half track while the time $t_1$ has passed. Accordingly, the light spot is moved by one track when the jumping operation is completed.

However, the actuator constants Kf, R and M are changed in accordance with various kinds of tolerances, temperature, time. Strictly speaking, it is necessary to consider an error in conversion of the D/A converter 10, an error in operation of the amplifier 7, etc. Accordingly, there is a case in which the acceleration AC of the light spot is greatly dispersed with respect to the command value C.

The waveform b shows a case in which the acceleration AC of the light spot is excessively small with respect to the command value C. In this case, no light spot is moved by the half track when the time $t_0$ has passed.

Accordingly, the voltage of the tracking error signal TE at this time is greater than zero.

Further, the waveform c shows a case in which the acceleration AC of the light spot is excessively large with respect to the command value C. In this case, the light spot is moved by a distance exceeding the half track when the time $t_0$ has passed.

Accordingly, the voltage of the tracking error signal TE at this time is smaller than zero.

In FIG. 4, the accelerating operation of the light spot is switched to the decelerating operation when the time $t_0$ has passed. At this switching time, a voltage value of the tracking error signal TE is set to TE(H) and is shown by a black circle.

As can be seen from FIG. 4, when the acceleration of the light spot is excessively small, TE(H)>0 is formed. In contrast to this, when the acceleration of the light spot is excessively large, TE(H)<0 is formed.

When the acceleration of the light spot is set to be suitable, TE(H) is approximately equal to zero.

Accordingly, if the command value C is increased or decreased such that this TE(H) approaches zero, it is possible to suitably correct dispersion in acceleration AC with respect to the command value C.

Figure 5:
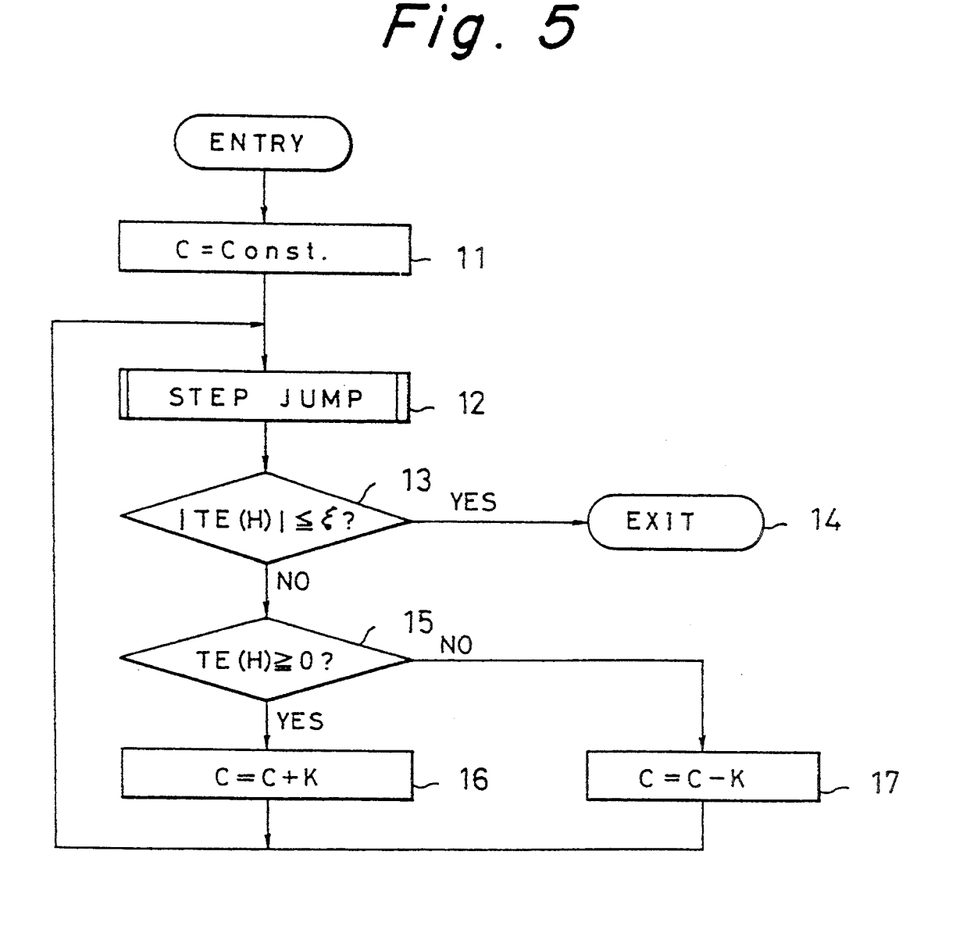
FIG. 5 is a flow chart showing a main processing flow of the CPU 9 when a command value C is corrected in the jump pulse corrector in the first embodiment.

FIG. 5 shows a concrete algorithm of the CPU 9 for correcting such a command value C.

FIG. 5 is a flow chart showing a main processing flow of the CPU 9 when the command value C is corrected in the jump pulse corrector in the first embodiment. In FIG. 5, reference numerals #11 to #17 designate processing steps.

In the step #11, a DA-command value C is set to a constant Const.

As explained in relation to the above formulas (1) to (4), etc., this constant Const. is a constant selected in advance by using the typical actuator constants Kf, R and M.

In the step #12, the step jumping operation of a light spot is executed. This step jumping operation is shown in detail in FIG. 3.

In the meanwhile, a voltage value TE(H) of the tracking error signal TE is measured after the time $t_0$ has passed.

In the step #13, it is judged whether $|TE(H)| \leq \epsilon$ is formed or not. In this case, $\epsilon$ is a small value which is not equal to zero. If $|TE(H)| \leq \epsilon$ is formed, it proceeds to the step #14 and processing for correcting the command value is completed.

$\epsilon$ is not equal to zero since noises are included in the value TE(H) of the tracking error signal TE for various kinds of reasons and there is a possibility that no execution of a correcting loop is terminated forever if $\epsilon$ is set to zero.

If no $|TE(H)| \leq \epsilon$ is formed in the step #13, it proceeds to the step #15 for judging whether TE(H) is positive or negative.

If TE(H)≧0, an acceleration of the light spot is excessively small. Accordingly, in the next step #16, a constant K is added to the command value C so that the command value C is increased.

In contrast to this, when TE(H)<0 is formed, the acceleration of the light spot is excessively large so that it proceeds to the step #17. In the step #17, the constant K is subtracted from the command value C so that the command value C is reduced.

Thereafter, it is again returned to the above step #12 and the step jumping operation is executed.

In the above processings in the steps #11 to #17, $|TE(H)| \leq \epsilon$ is finally formed so that execution of this loop is terminated.

Accordingly, it is possible to provide an acceleration AC of the light spot suitably corresponding to the corrected command value C so that the step jumping operation is stably performed thereafter.

A jump pulse corrector in accordance with a second embodiment of the present invention will next be explained. This second embodiment corresponds to second, fourth and fifth structures of the present invention.

A hardware construction in this embodiment is similar to that shown in FIG. 1.

In the first embodiment, the relation between acceleration AC of the light spot as an actuator acceleration and the value TE(H) of the tracking error signal TE is explained in relation to FIG. 4.

Figure 6:
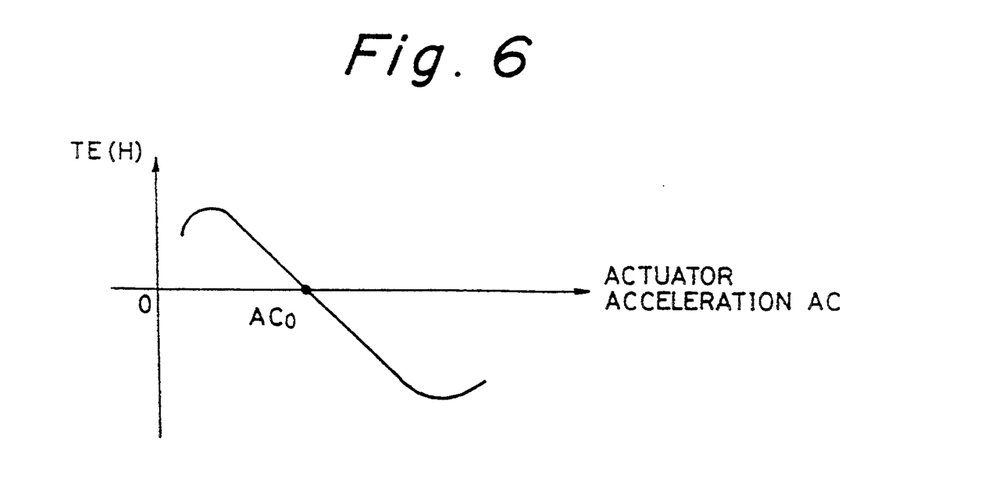
FIG. 6 is a characteristic view showing one example of the relation between an acceleration AC of an actuator and a voltage value TE(H) of a tracking error signal TE in a jump pulse corrector in accordance with a second embodiment of the present invention.

FIG. 6 is provided by rewriting FIG. 4 with respect to the acceleration AC and the value TE(H).

FIG. 6 is a characteristic view showing one example of the relation between the acceleration AC of an actuator and the voltage value TE(H) of the tracking error signal TE in the jump pulse corrector in accordance with the second embodiment of the present invention. In FIG. 6, an axis of abscissa shows the acceleration AC and an axis of ordinate shows the value TE(H) of the tracking error signal TE. $AC_0$ shows an acceleration showing TE(H)=0.

As shown in FIG. 6, when the acceleration AC of the actuator is equal to $AC_0$, the relation between the acceleration AC and the value TE(H) of the tracking error signal TE is set to a relation having an inclination reduced rightward and providing TE(H)=0.

The tracking error signal TE has a waveform approximately formed in the shape of a straight line in a constant range in which $AC=AC_0$ is approximately formed.

When the inclination of this straight line is set to D(≧0), the relation between the acceleration AC and the value TE(H) of the tracking error signal TE is provided by the following formula (5).

$$TE(H) = D*(AC_0 - AC) \quad (5)$$

The command value C is corrected by using a negative feedback loop on the basis of this relation shown by the formula (5) such that the acceleration AC of the actuator is equal to a suitable value.

Figure 7:
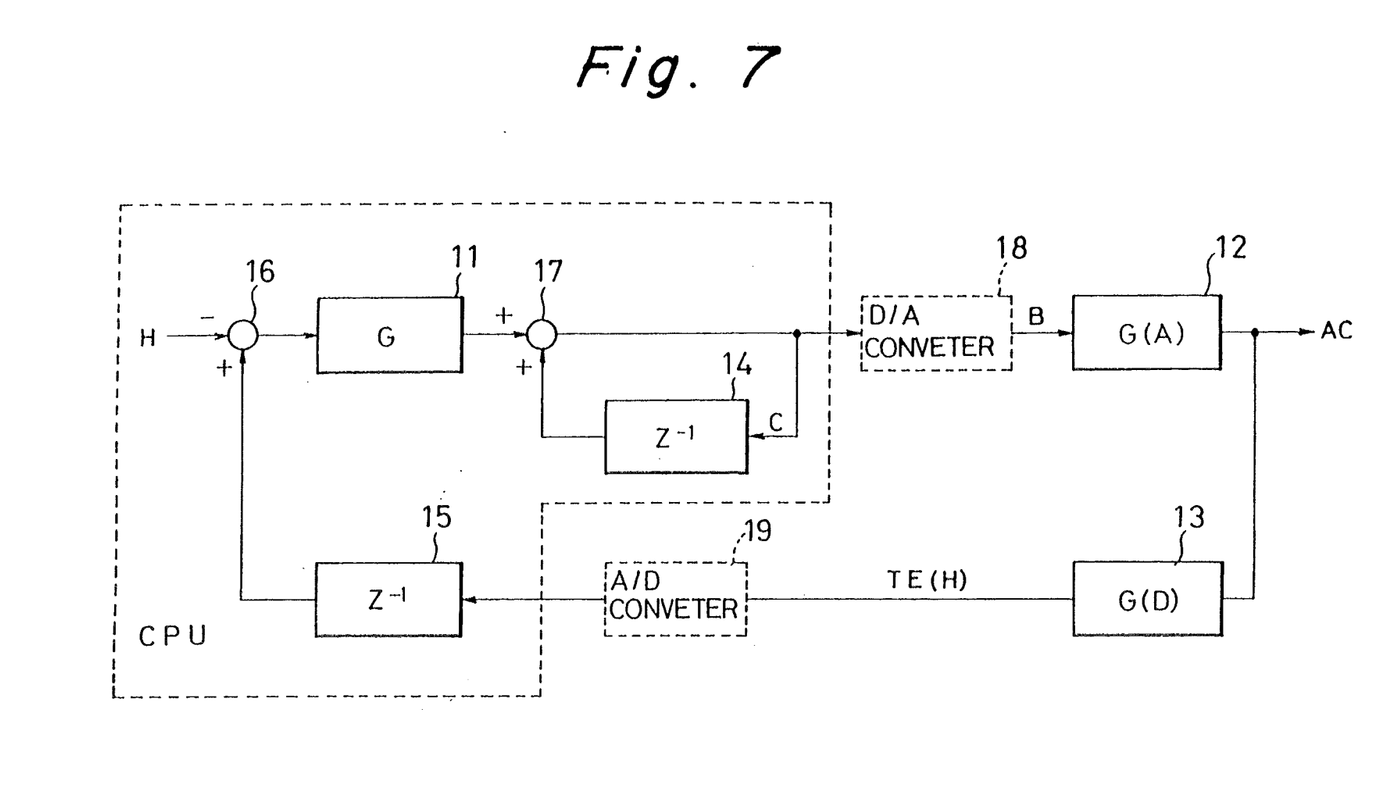
FIG. 7 is a circuit diagram illustrating an equivalent circuit showing the concept of a correcting loop for correcting a command value C in the jump pulse corrector shown in FIG. 1.

A concrete loop for correcting the command value C is provided as shown in FIG. 7. In the jump pulse corrector shown in FIG. 1, it is sufficient to form a loop for correcting the command value C by using a negative feedback loop such that the acceleration AC of the actuator is equal to a suitable value by the relation shown by the formula (5).

FIG. 7 is an equivalent circuit showing the concept of a loop for correcting the command value C in the jump pulse corrector of the present invention shown in FIG. 1. In FIG. 7, reference numerals 11 to 13 designate arithmetic circuits. Reference numerals 14 and 15 designate memories. Each of reference numerals 16 and 17 designates an adder or subtracter. Reference numerals 18 and 19 designate equivalent circuits of the D/A converter 10 and the A/D converter 8 shown in FIG. 1.

In FIG. 7, H is a convergent target value of the correcting loop and the command value C is corrected such that TE(H)=H is finally formed.

A block surrounded by a broken line in FIG. 7 is a block for transmitting the algorithm of a CPU to make a calculation represented by formula (7) described later.

A value G of the arithmetic circuit 11 is set to a predetermined coefficient for determining a convergent speed of the correcting loop.

The two memories 14 and 15 respectively hold the command value C and the value TE(H).

The arithmetic circuit 12 has a function for calculating a product G(A) of a gain of the amplifier 7 and each of the above constants of the actuator 4.

In this arithmetic circuit 12, a relative formula for calculating the acceleration AC of a light spot from an applied voltage B is similar to the above formula (1).

Namely, the product G(A) is provided by the following formula (6).

$$G(A) = Kf/(R,M) * (\text{gain of amplifier}) \tag{6}$$

An operation for providing the acceleration AC of the light spot from the applied voltage B on an input side of the arithmetic circuit 12 is also similar to that in the general jump pulse corrector.

The arithmetic circuit 13 calculates the above formula (5).

Namely, the arithmetic circuit 13 calculates a voltage value TE(H) of the tracking error signal TE from the acceleration AC inputted from the arithmetic circuit 12. The memory 15 holds the calculated value TE(H) from the arithmetic circuit 13.

The algorithm of the correcting loop will next be explained.

Figure 8:
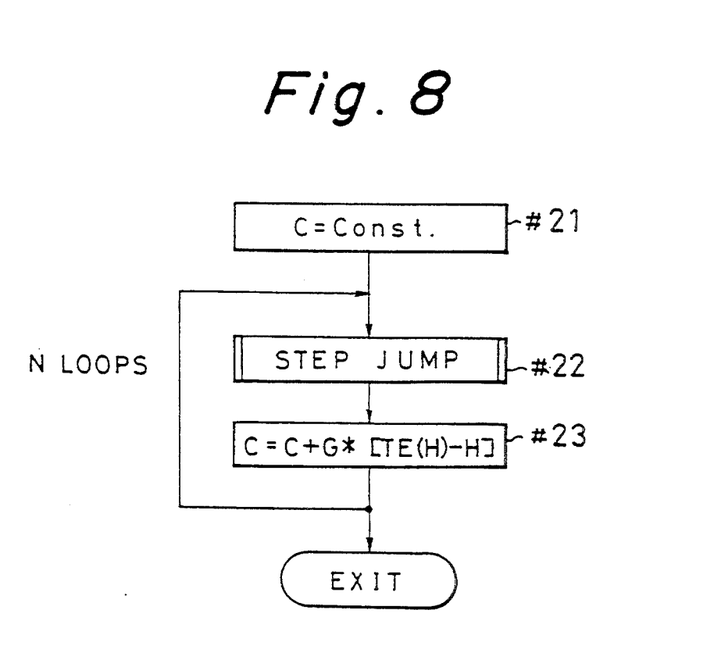
FIG. 8 is a flow chart showing a main processing flow of a CPU 9 at a loop correcting time in the jump pulse corrector in the second embodiment.

FIG. 8 is a flow chart showing a main processing flow of the CPU 9 at a loop correcting time in the jump pulse corrector in the second embodiment. In FIG. 9, reference numerals #21 to #23 designate processing steps.

In the step #21, a DA-command value C is set to a constant Const.

As explained in relation to the above formulas (1) to (4), this constant Const. is a constant selected in advance by using the typical actuator constants Kf, R and M.

In the step #22, the step jumping operation of a light spot is executed as shown in FIG. 3 in detail.

While this step jumping operation is performed, a voltage value TE(H) of the tracking error signal TE is measured after a time $t_0$ has passed.

In the step #23, the command value C is calculated by the following formula (7).

$$C = C + G * [TE(H) - H] \tag{7}$$

As already described above, the value H in this formula is a convergent target value of the correcting loop and the command value C is corrected such that TE(H)=H is finally formed.

Thereafter, it is returned to the step #22 and the loop for calculating the formula (7) is repeatedly executed by predetermined N times.

This calculating operation will next be explained in detail.

Figure 9:
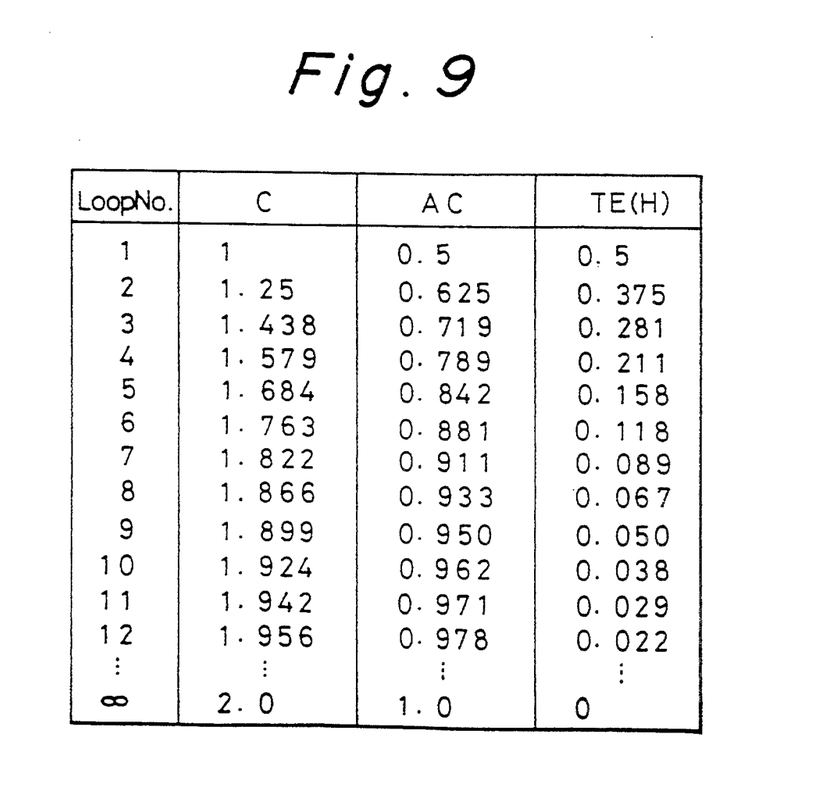
FIG. 9 is a table showing an operational example of the jump pulse corrector in the second embodiment every one loop using algorithm thereof.

FIG. 9 is a table showing an operational example of the jump pulse corrector in the second embodiment every one loop using algorithm thereof.

In FIG. 9, each of variables and constants G(A), Const., $AC_0$, D, G and H is supposed as follows as one example.

G(A)=0.5
Const.=1
$AC_0$=1
D=1
G=0.5
H=0

If H=0 is set, the command value C is corrected by using the above formula (7) such that TE(H)=0 is finally formed.

In the above condition, G(A)=0.5, Const.=1 and $AC_0$=1 are set. This means that the command value C is designed in a prerequisite for G(A)=1.

Namely, G(A)=0.5 means a supposition in which a product of the actuator constants and the amplifier gain in the formula (6) is dispersed by 50% with respect to a prerequisite or reference value.

As shown in FIG. 6, the acceleration AC providing TE(H)=0 is equal to $AC_0$ so that the acceleration AC is suitably set to one.

The command value C at the next time is calculated by using the following formula (7) from the above measured results.

$$\begin{aligned} C(\text{next time}) &= C(\text{this time}) + G * [TE(H) - H] \tag{10} \\ &= 1 + 0.5 * (0.5 - 0) \\ &= 1.25 \end{aligned}$$

In the case of Loop No.=2, step jumping processing is performed by using this C=1.25.

The acceleration AC, the value TE(H) and the command value C at the next time are then provided as follows.

$$AC = 1.25 * 0.5 = 0.625 \tag{11}$$

$$TE(H) = 1 * (1 - 0.625) = 0.375$$

$$\begin{aligned} C(\text{next time}) &= 1.25 + 0.5 * (0.375 - 0) \tag{12} \\ &= 1.4375 \end{aligned}$$

Similarly, the step jumping processing is performed by accumulating G*[TE(H)−H] to C.

As shown in a lowest row in FIG. 9, C=2.0, AC=1 and TE(H)=0 are finally formed.

As mentioned above, the command value C is suitably corrected with respect to dispersions in actuator constants, etc. so that the step jumping operation is stably performed.

No convergent target value H of TE(H) is necessarily set preferably to zero for the following reasons.

Namely, when the inductance of an actuator coil is large, an electric current flowing through the coil is not rapidly increased, but is slowly increased when a pulse voltage is applied to the coil.

As can be seen from the above formula (1), the acceleration of an actuator is proportional to the coil electric current. Accordingly, when the coil inductance is large, no relation between the voltage B and the acceleration of a light spot is necessarily provided as shown in FIG. 4.

In such a case, more preferable results can be obtained by switching accelerating and decelerating operations when no TE(H) is equal to zero.

In the second embodiment, H is set to zero to clarify the present invention and there is no special explanation about H≠0.

However, the command value C is also corrected in the case of H≠0 such that an acceleration AC providing TE(H)=H is obtained by suitably executing the correcting loop explained in association with FIGS. 7 and 8.

When a value of the coefficient G is set to be small, a subtracted value [TE(H)−H] is accumulated to the command value C at a smaller ratio so that the correcting loop is slowly converged.

In other words, it is possible to restrain influences of noises in measurement of TE(H) and errors in measurement of TE(H) caused by eccentricity of an optical disk, vibration and disturbance of the tracking error signal TE caused when the light spot passes through an address section of the optical disk.

Therefore, the correcting loop is slowly converged even when such errors in measurement are caused.

This is because the effects of a low frequency filter are caused by the accumulative loop represented by the above formula (7).

Therefore, when these effects are used, the correcting loop is rapidly converged by using a relatively large value as the coefficient G in an initial correction of the command value C. Thereafter, the correcting operation is continuously performed by using a relatively small value as the coefficient G every one step jumping operation when the jump pulse corrector is really operated. Thus, the command value C can be suitably corrected even when the actuator constants, etc. are slowly changed by a change in temperature, etc.

A jump pulse corrector in accordance with a third embodiment of the present invention will next be explained.

This third embodiment corresponds to sixth to ninth structures of the present invention.

A system for directly correcting the command value C is used in the above first and second embodiments.

In contrast to this, in the third embodiment, the command value C is set to a constant and a coefficient multiplied by this command value C is multiplicatively corrected.

In this correcting system, the corrected coefficient is set to a value for canceling changes in actuator constants, etc. For example, when the actuator constants, etc. are reduced by 50% from reference values thereof, the corrected coefficient is increased by 50%.

Accordingly, the jump pulse corrector is operated by multiplying the command value C by the above coefficient at a driving time of the actuator except for a step jumping time. For example, at this driving time of the actuator, a track follow-up servo operation and a seek control operation are performed. Thus, the operation of the jump pulse corrector can be controlled with constant loop gain in any case so that the moving speed of a light spot can be stably controlled, thereby obtaining peculiar effects of the present invention.

A hardware construction of the jump pulse corrector in the third embodiment will next be described.

Figure 10:
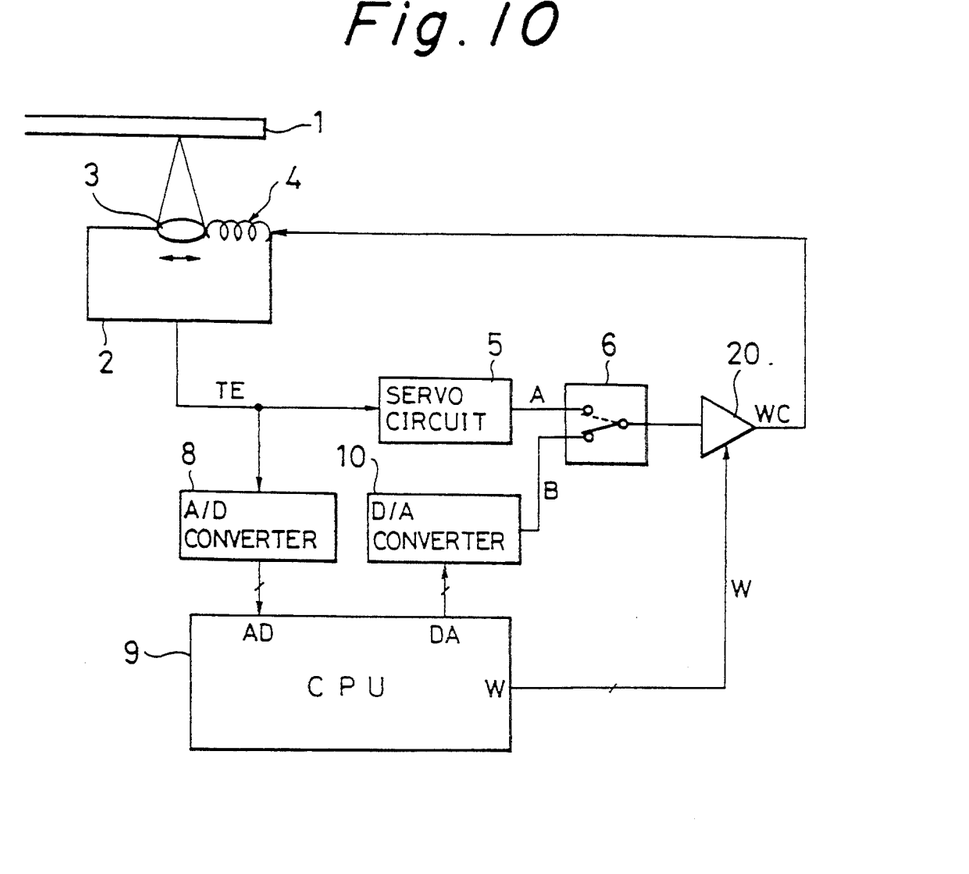
FIG. 10 is a functional block diagram showing an example of the main construction of a jump pulse corrector in accordance with a third embodiment of the present invention.

FIG. 10 is a functional block diagram showing a main construction of the jump pulse corrector in accordance with the third embodiment of the present invention. Reference numerals in FIG. 10 are similar to those in FIG. 1. Reference numerals 20, W and WC respectively designate a variable gain amplifier, a control command signal from a CPU 9 and an output signal of the variable gain amplifier 20.

In the jump pulse corrector shown in FIG. 10, the variable gain amplifier 20 is used instead of the amplifier 7 in FIG. 1. The other constructions are similar to those in FIG. 1.

A gain of the variable gain amplifier 20 is controlled by the control command signal W from the CPU 9.

The relation between the gain of the variable gain amplifier 20 and the control command signal W will next be explained.

Figure 11:
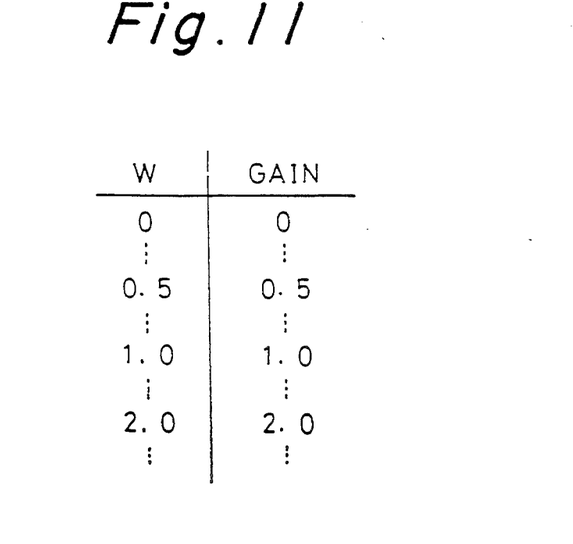
FIG. 11 is a table showing one example of the relation between a control command signal W and a gain in the jump pulse corrector in the third embodiment.

FIG. 11 is a table showing one example of the relation between the control command signal W and the above gain in the jump pulse corrector in the third embodiment.

As shown in FIG. 11, the gain of the variable gain amplifier 20 is changed in accordance with the control command signal W. For brevity, the relation between the control command signal W and the gain of the variable gain amplifier 20 is set to one-to-one corresponding relation. However, it is sufficient to make the control command signal W proportional to this gain.

For example, an engineer in the field of an electronic circuit can easily construct such a variable gain amplifier 20 by a D/A converter of a multiplicative type, etc.

The concept of a correcting loop will next be explained in the jump pulse corrector of the present invention shown in FIG. 10.

Figure 12:
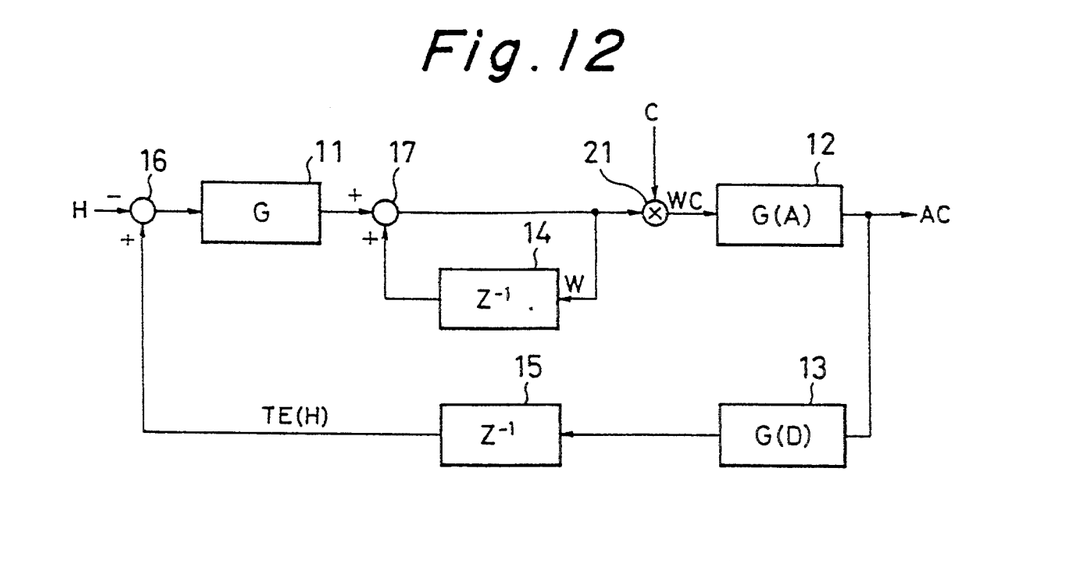
FIG. 12 is a circuit diagram illustrating an equivalent circuit showing the concept of a correcting loop for correcting a command value C in the jump pulse corrector in the third embodiment.

FIG. 12 is an equivalent circuit showing the concept of a loop for correcting a command value C in the jump pulse corrector shown in FIG. 10. Reference numerals in FIG. 12 are similar to those in FIG. 7. Reference numeral 21 designates an arithmetic circuit corresponding to the variable gain amplifier 20 shown in FIG. 10.

H, G(D) and G in FIG. 12 are similar to those in FIG. 7, but G(A) shows a transmission gain from an output WC of the variable gain amplifier 20 until an actuator acceleration. Namely, G(A) is provided by the following formula (13).

$$G(A) = Kf/(R^*M) \tag{13}$$

In FIG. 12, C shows a DA-command value and is set to a constant in this embodiment.

An arithmetic circuit 21 corresponds to the variable gain amplifier 20 in FIG. 10. The relation between a control command signal W and the constant C is provided by the following formula (14).

$$WC = W^*C \tag{14}$$

Two memories 14 and 15 respectively hold the control command signal W and a voltage value TE(H) of a tracking error signal TE until the next execution.

Figure 13:
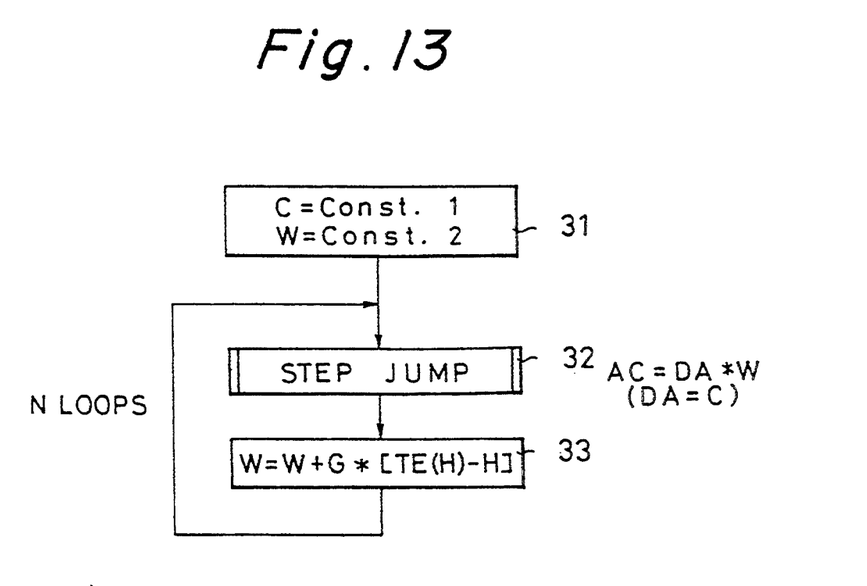
FIG. 13 is a flow chart showing a main processing flow of a CPU 9 when the command value C is corrected in the jump pulse corrector in the third embodiment.

FIG. 13 shows a concrete algorithm of a CPU 9 for variably controlling a gain of the variable gain amplifier 20 in the jump pulse corrector in FIG. 12.

FIG. 13 is a flow chart showing a main processing flow of the CPU 9 when the command value C is corrected in the jump pulse corrector in the third embodiment. In FIG. 13, reference numerals #31 to #33 designate processing steps.

In the step #31, C=Const. 1 and W=Const. 2 are set. Const. 1 and Const. 2 are initial constants.

Each of these constants is normally set by using typical reference values of actuator constants, etc.

In the next step #32, a step jumping operation is executed.

Step jumping processing is similar to that in FIG. 3. The value TE(H) is also measured in this third embodiment.

In the next step #33, a constant H is subtracted from the measured value TE(H). The subtracted value is multiplied by a coefficient G. The multiplied value is accumulatively added to a variable W. Thus, the variable W is calculated by the following formula (15).

$$W = W + G*[TE(H) - H] \qquad (15)$$

Thereafter, it is again returned to the step #32 and the step jumping operation is executed. In the step #33, the variable W is again calculated in accordance with the formula (15).

Such a loop is repeatedly executed predetermined N times and execution of this processing flow shown in FIG. 13 is terminated.

In the above processings in the steps #31 to #33, the variable W is corrected such that TE(H)=H is formed.

Figure 14:
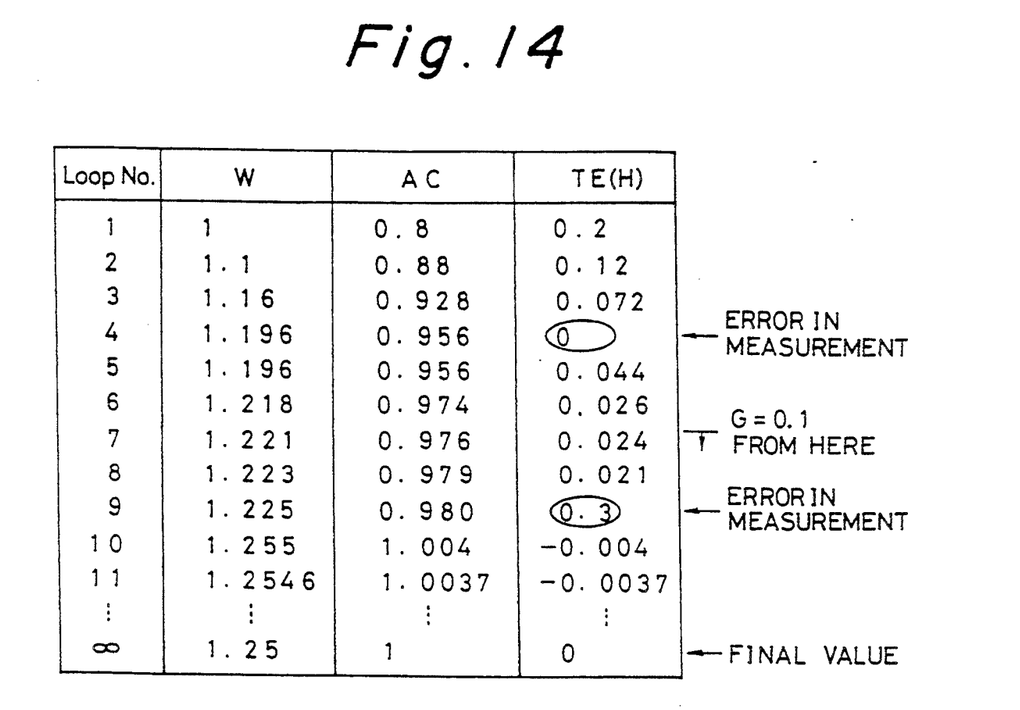
FIG. 14 is a table showing an operational example of the jump pulse corrector in the third embodiment every one loop using algorithm thereof.

FIG. 14 is a table showing an operational example of the jump pulse corrector in the third embodiment every one loop using algorithm thereof.

FIG. 14 shows an operation of the jump pulse corrector shown in FIGS. 12 and 13 every loop when the above-mentioned values and constants are supposed as follows as one example.

G(A)=0.8
C=1
$AC_0$=1
D=1
G=0.5
H=0

In FIG. 14, in the case of Loop No.=1 showing a first correcting time, the value W is set to one. In the step #32 in FIG. 13, a generating acceleration AC in step jumping processing is provided by the following formula (16).

$$AC = W*C*G(A) = 0.8 \qquad (16)$$

TE(H) is measured and provided by the following formula (17).

$$TE(H) = D * (AC_0 - AC) \qquad (17)$$
$$= 0.2$$

Accordingly, the variable W at the next time is obtained as follows from the above formula (15).

$$W(\text{next time}) = W + G * [TE(H) - H] \qquad (18)$$
$$= 1 + 0.5 * (0.2 - 0)$$
$$= 1.1$$

In the case of Loop No.=2, W, AC, TE(H) and the variable W at the next time are provided as follows.

W=1.1
AC=1.1*1*0.8=0.88
TE(H)=1*(1−0.88)=0.12
W(next time)=1.1+0.5*(0.12−0)=1.16

Thereafter, W, AC and TE(H) are similarly converged and finally approach the following values.

W=1.25
AC=1
TE(H)=0

W=1.25 is obtained as follows. Namely, G(A)=1 is first set as a prerequisite and Const. 1=1 and Const. 2=1 are set to form AC=1. However, G(A)=0.8 is really formed so that the variable W as a correction coefficient is calculated by the following formula (19).

$$W = 1/G(A) = 1/0.8 = 1.25 \qquad (19)$$

In FIG. 14, in the cases of Loop No.=4 and Loop No.=9, it is assumed that TE(H) is measured in error by noises, etc.

In the case of Loop No.=7 or more, G is set to 0.1 as a relatively small value.

As explained in the above second embodiment, the above operation of the jump pulse corrector means that the entire correcting loop has the effects of a low frequency filter by the accumulative loop represented by the formula (15) (the formula (7) in the second embodiment) so that the influence of an error in measurement of TE(H) is restrained.

In the above respective embodiments, it is possible to calculate the coefficient W for correcting changes in actuator constants, etc.

Accordingly, a multiplying operation of the correction coefficient W is performed to form a servo loop in the jump pulse corrector in FIG. 10 when the switching circuit 6 is switched from an input terminal B to an input terminal A to perform a track follow-up servo operation. Accordingly, a change in servo loop gain caused by the changes in actuator constants, etc. is suitably corrected by the coefficient W.

In addition to the track follow-up control, the multiplying operation of the coefficient W can be also performed in all driving operations of an actuator such as seek control for greatly moving a light spot in the radial direction of an optical disk, multitrack jump control and hold servo control for holding the actuator in a reference position on an optical head. Accordingly, the changes in actuator constants, etc. are effectively corrected in each of these controls.

In the above respective embodiments, all of the servo circuit, the switching circuit, the amplifier, etc. are of analog type. However, an entire control system including these circuits can be clearly realized by using digital signal processing.

Many widely different embodiments of the present invention may be constructed without departing from the spirit and scope of the present invention. It should be understood that the present invention is not limited to the specific embodiments described in the specification, except as defined in the appended claims.

What is claimed is:

1. A jump pulse corrector comprising:

light spot moving device for displacing a light spot in a direction perpendicular to a track of a disk;

tracking error signal detecting circuit for outputting a tracking error signal obtained in accordance with the relation in relative position between said light spot and the track;

a track jumping circuit for generating and transmitting a pulse signal for moving said light spot in the direction perpendicular to the track to said light spot moving device;

a level holding device for holding a voltage level of said tracking error signal after a constant time since said pulse signal was transmitted to the light spot moving device;

a level comparing circuit for comparing the voltage level of said tracking error signal with a predetermined level; and a pulse height correcting device for correcting a wave height value of said pulse signal by accumulating comparing results of said level comparing circuit to the wave height value of said pulse signal at a predetermined ratio.

2. A jump pulse corrector as claimed in claim 1, wherein said predetermined value is approximately zero.

3. A jump pulse corrector comprising:
a light spot moving device for displacing a light spot in a direction perpendicular to a track of a disk;
a tracking error signal detecting circuit for outputting a tracking error signal obtained in accordance with the relation in relative position between said light spot and the track;
a track jumping circuit for generating and transmitting a pulse signal for moving said light spot in the direction perpendicular to the track to said light spot moving device;
a polarity inverting circuit for inverting a polarity of said pulse signal after a constant time since said pulse signal was transmitted to said light spot moving device;
a level holding device for holding a voltage level of said tracking error signal when the polarity of the pulse signal is inverted by said polarity inverting circuit;
a level comparing circuit for comparing the voltage level of said tracking error signal with a predetermined level; and
a pulse height correcting device for correcting a wave height value of said pulse signal by accumulating comparing results of said level comparing circuit to the wave height value of said pulse signal at a predetermined ratio.

4. A jump pulse corrector comprising:
a light spot moving device for displacing a light spot in a direction perpendicular to a track of a disk;
a tracking error signal detecting circuit for outputting a tracking error signal obtained in accordance with the relation in relative position between said light spot and the track;
a track jumping circuit for generating a pulse signal;
a multiplying circuit for operating said light spot moving device in accordance with results obtained by multiplying a value shown by said pulse signal by a coefficient;
level holding device for holding a voltage level of said tracking error signal after a constant time since said pulse signal was generated; and
coefficient correcting circuit for correcting said coefficient such that the voltage level of said tracking error signal is equal to a predetermined value.

5. A jump pulse corrector comprising:
a light spot moving device for displacing a light spot in a direction perpendicular to a track of a disk;
a tracking error signal detecting circuit for outputting a tracking error signal obtained in accordance with the relation in relative position between said light spot and the track;
a track jumping circuit for generating a pulse signal;
a multiplying circuit for operating said light spot moving device in accordance with results obtained by multiplying a value shown by said pulse signal by a coefficient;
a level holding device for holding a voltage level of said tracking error signal after a constant time since said pulse signal was generated;
a level comparing circuit for comparing the voltage level of said tracking error signal with a predetermined level; and
a coefficient correcting circuit for correcting said coefficient by accumulating comparing results of said level comparing circuit to said coefficient at a predetermined ratio.

6. An optical disk unit comprising:
a light spot moving device for displacing a light spot in a direction perpendicular to a track of a disk;
a tracking error signal detecting circuit for outputting a tracking error signal obtained in accordance with the relation in relative position between said light spot and the track;
a track jumping circuit for generating a pulse signal;
a multiplying circuit for operating said light spot moving device in accordance with results obtained by multiplying a value shown by said pulse signal by a coefficient;
a memory circuit for correcting and holding said coefficient such that a moving amount of the light spot according to an output of said multiplying circuit is equal to a predetermined amount; and
a tracking servo circuit for controlling the relation in position between the track and the light spot displaced by said light spot moving device;
said light spot moving device being operated in accordance with results obtained by multiplying an output of said tracking servo circuit by said corrected coefficient.

7. An optical disk unit comprising:
a light spot moving device for displacing a light spot in a direction perpendicular to a track of a disk;
a tracking error signal detecting circuit for outputting a tracking error signal obtained in accordance with the relation in relative position between said light spot and the track;
a pulse signal generating device for generating a pulse signal;
a multiplying circuit for operating said light spot moving device in accordance with results obtained by multiplying a value shown by said pulse signal by a coefficient;
a level holding device for holding a voltage level of said tracking error signal after a constant time since said pulse signal was generated;
a level comparing circuit for comparing the voltage level of said tracking error signal with a predetermined level;
a coefficient correcting circuit for correcting said coefficient by accumulating comparing results of said level comparing circuit to said coefficient at a predetermined ratio;
a memory for holding the corrected coefficient of said coefficient correcting means; and
a tracking servo circuit for controlling the relation in position between the track and the light spot displaced by said light spot moving device;
said light spot moving device being operated in accordance with results obtained by multiplying an output of said tracking servo circuit by said corrected coefficient.

* * * * *